Aug. 9, 1938.  A. I. SCHLICHTER  2,126,416
ATTACHMENT FOR ALIMENTARY FORMING MACHINES
Filed Dec. 10, 1936  2 Sheets-Sheet 2
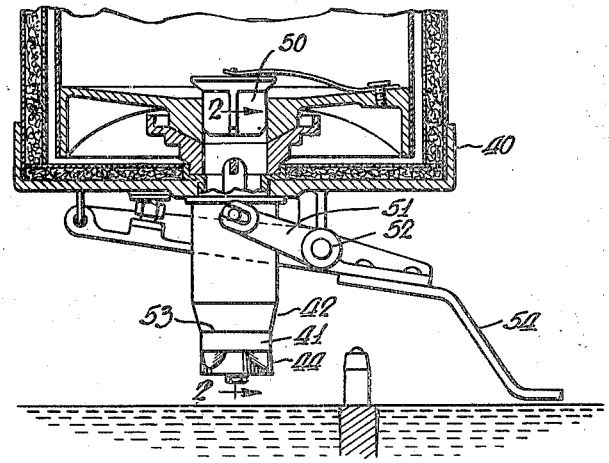
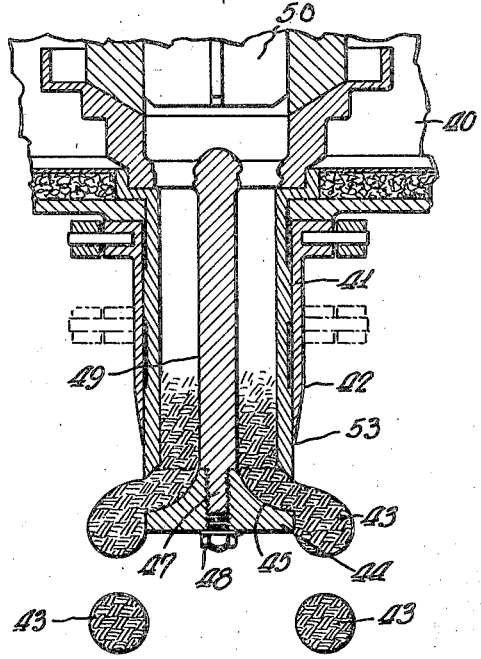
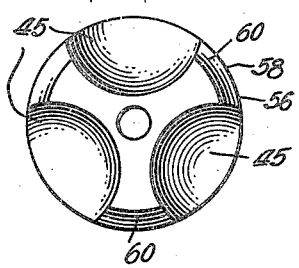
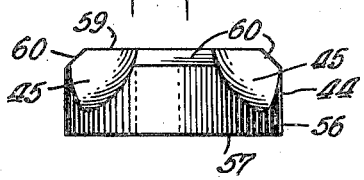
INVENTOR
Arthur I. Schlichter
BY Richard Newling
ATTORNEY Patented Aug. 9, 1938

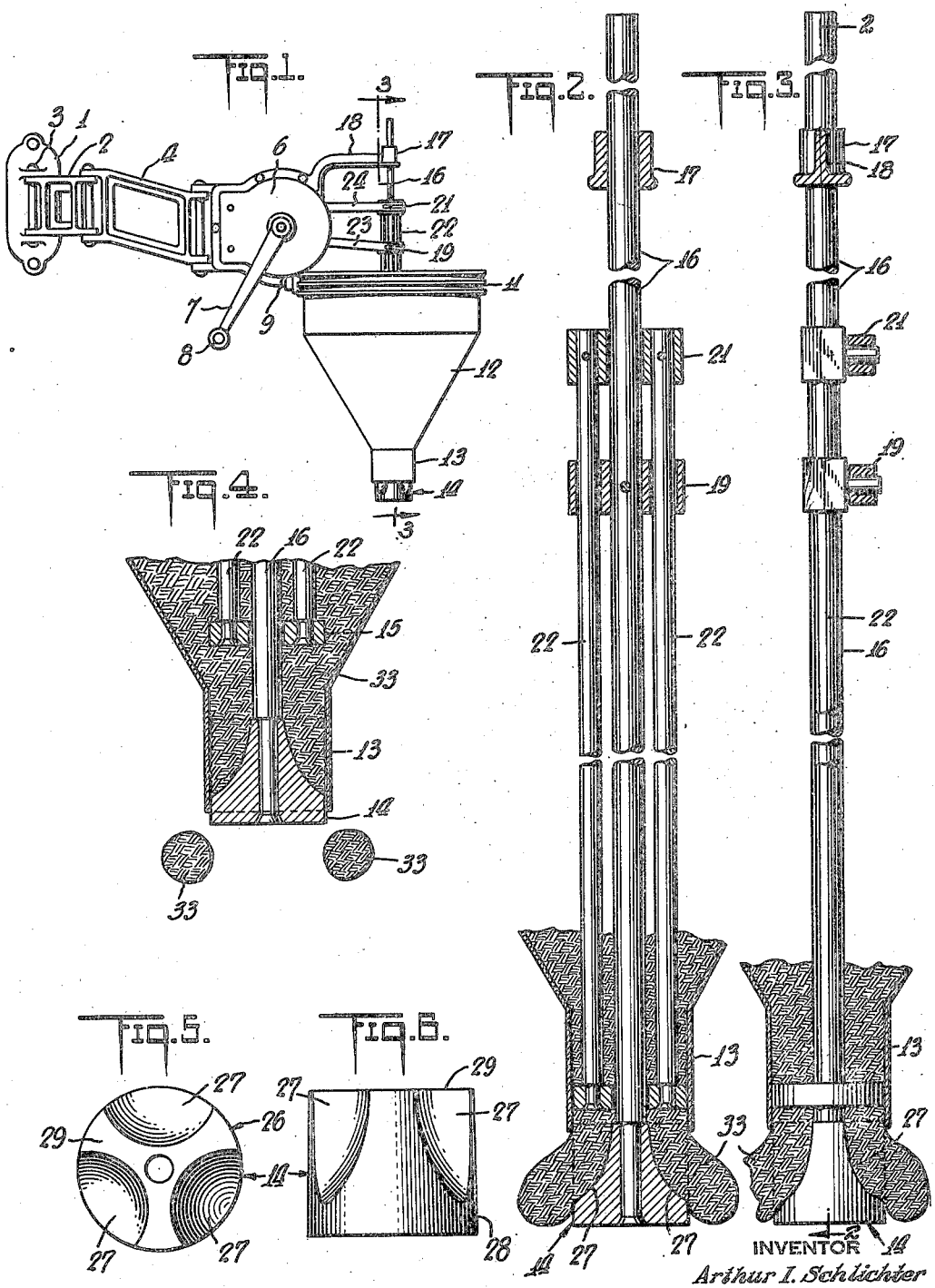

2,126,416

UNITED STATES PATENT OFFICE 2,126,416

ATTACHMENT FOR ALIMENTARY FORMING MACHINES

Arthur I. Schlichter, New York, N. Y., assignor to Joe Lowe Corporation, New York, N. Y., a corporation of Delaware Application December 10, 1936, Serial No. 115,255

8 Claims. (Cl. 107—14)

The present invention relates generally to alimentary forming machines, and it has particular relation to improvements in an extruding die for such machines whereby the machines, originally designed for making doughnuts or annular products, may easily and quickly be utilized for making products of entirely different shapes.

An object of the invention is the provision of a suitable attachment by which conventional doughnut forming and cutting machines may be quickly, efficiently and economically adapted for producing products of other distinctive shapes or forms from the annular formations for which they were designed and intended.

A further object of the invention is to provide a suitable attachment by which conventional doughnut forming and cutting machines may be economically and efficiently provided with means for producing a spherical product.

Another object of the invention is the provision of a suitable simple and inexpensive extruding die which may be inserted in the cutting head of a conventional doughnut forming and cutting machine to provide means by which such machines, without further alteration or change, may be utilized to form and cut globular or cylindrical pieces of dough.

Other and further objects and advantages of the invention reside in the detailed construction of the apparatus, which result in simplicity, economy and efficiency, and which will be apparent from the following description, wherein a preferred form of embodiment of the invention is shown, reference being had to the accompanying drawings, forming a part hereof, in which:

Fig. 1 is a side view of a conventional type of manually operable alimentary forming machine, such as is disclosed in United States Letters Patent No. 1,811,564, equipped with my invention;

Fig. 2 is an enlarged sectional view on the line 2—2 of Fig. 3, looking in the direction of the arrows, and illustrating the position of the pistons, die and valve mechanism at the time the dough is being extruded;

Fig. 3 is an enlarged sectional view on the line 3—3 of Fig. 1, looking in the direction of the arrows;

Fig. 4 is an enlarged sectional view of the neck of the hopper, illustrating the position of the pistons and valve operating mechanism at the time a fresh charge of dough is drawn in between the pistons during one position of the operation.

Fig. 5 is a top plan view of the extruding die for the manually operated machine shown in Fig. 1;

Fig. 6 is a side elevational view of the extruding die shown in Fig. 5;

Fig. 7 is a vertical sectional view through the lower part of a conventional type of power operated alimentary forming machine, such as is disclosed in United States Letters Patent No. 1,492,542, embodying my invention;

Fig. 8 is a vertical sectional view, on a larger scale, on the line 8—8 of Fig. 7, illustrating the manner in which the dough is extruded through the machine, when it is equipped with my extruding die;

Fig. 9 is a top plan view of the extruding die for the power operated machine shown in Fig. 7; and Fig. 10 is a side elevational view of the extruding die shown in Fig. 9.

Referring now to the machine shown in Figs. 1 to 6, inclusive, of the drawings, wherein like numerals indicate like parts, there is shown a supporting bracket 1, which may be secured to a wall or other vertical surface. A supporting arm 2 extends from a pivotal pin 3 carried by the bracket 1 and a second supporting arm 4 is pivotally connected with the outer end of the supporting arm 2. A housing 6, enclosing a suitable manually operable driving mechanism, is pivotally mounted on the outer end of the supporting arm 4 and is provided with a crank arm 7 and a handle 8.

Secured to the bottom of the housing 6, as indicated at 9, is a supporting ring 11 for supporting a hopper 12. Within the hopper 12 there is provided a tubular discharge neck 13 through which discharge pistons 14 and 15 reciprocate. A rod 16 extends upwardly from the piston 14 and slidably through a bearing sleeve 17, supported by an arm 18 extending outwardly from the housing 6. A block 19 is secured to the rod 16 and the rod extends slidably through a similar block 21. By means of rods 22, the piston 15 is operatively connected with the block 21. The rods 22 extend slidably through the block 19. The reciprocating movement of the pistons 14 and 15, forming the valve operating mechanism, is imparted from the driving mechanism in the housing 6 through suitable connecting arms 23 and 24 in the manner described and illustrated in United States Letters Patent No. 1,811,564, aforementioned.

The lower die extruding piston 14 consists of a relatively thick cylindrical blank having a series of openings or indentures spaced circumferentially of its peripheral surface 28. These openings or indentures 27 are in open communication with the top 29 of the blank and connect with the peripheral surface 28. Various shapes and sizes of communicating openings may be employed without departing from the spirit of the invention. The form of opening shown in the drawings herein is a spherical indenture that is concaved both axially and radially and open throughout its length.

In operation of the machine, the piston 14, which is in reality my extruding die, has its lower limit of movement below the lower end of the neck 13 of the hopper 12, but not to an extent sufficient to allow the top 29 to clear the bottom of the neck 13, thereby leaving only the indentures 27 as the passage way for the dough to be forced therefrom. After the piston 14 reaches its lower limit of movement the piston 15 continues to move downwardly thereby forcing the dough caught between the pistons 14 and 15 through the openings formed by the indentures 27 in continuous strips of cylindrical shape. Subsequently, the piston 14 moves upwardly and cuts the strips or charges of dough off against the bottom of the neck 13 of the hopper 12, forming by reason of its plasticity and proper timing globular masses 33, as shown in Fig. 4. By varying the distance between the pistons 14 and 15 and consequently the charge of dough between the pistons, thereby changing the timing of the cut-off, the operator may, with my improved extruding die, produce various shapes, such as for example cylindrical stick-like portions of dough in lieu of the globular portions hereinbefore described. For proper clearance of the die or piston 14 with the walls of the neck 13 of the hopper 12, the blank 29 is slightly tapered at the sides, thereby making it slightly truncated conical in shape.

Referring now to the drawings, and particularly to Figs. 7 to 10 inclusive, which disclose a power operated doughnut machine of the type described in detail in United States Letters Patent No. 1,492,542, there is shown a conventional doughnut cooking and cutting machine 40, having an outlet tube 41 extending downwardly from the lower end thereof, and a cutting sleeve 42, which operates telescopically on the outside of the tube 41. The dough 43 extrudes through the tube and discharges from its lower end through the die 44 by means of the indentures 45, which forms an axial opening between the lower end of the tube and the bottom of the die 44, which is detachably mounted by a screw 47 and a nut 48 on the lower end of the rod 49, the upper part of the rod being supported integrally from a bridge or web 50 extending across the tube 41. The dough cutting sleeve 42 is operated by means of a double armed yoke 51 which is operatively pivoted at 52, and the yoke 51 is operated by a cam member 54 which lies in the path of actuating members (not shown but are employed in the patent hereinabove identified).

As the sleeve 41 moves downwardly after a sufficient quantity of dough 43 has been extruded through the indentures 45 of the die 44, the lower marginal cutting edge 53 of the sleeve 41 will act to cut the dough from the main portion thereof in the tube 41 against the peripheral edge 56 of the die.

In this automatic type of machine, the extruding die 44 embodying my invention consists of a cylindrical blank 44 having a peripheral edge 56 which is of cylindrical shape adjacent the bottom 57, and which is of truncated conical shape along its upper portion adjacent the top 59, as indicated at 60. The indentures 45 are spaced circumferentially of the peripheral surface, and may, of course, be of various sizes, shapes or numbers depending upon the finished product to be produced without departing from the spirit of my invention. These indentures are shown herein as being of spherical shape, being in fact concaved both axially and radially. It will be noted that the indentures 45 are open at the top 59 and extend downwardly and outwardly, thereby decreasing in depth both axially and radially, until they end at a point in the peripheral surface intermediate its ends.

By removing the nut 48, the die 44 may be readily detached from the machine, and the conventional flat cylindrical disc, shown and described in the Letters Patent aforementioned, may be substituted, thereby making the machine suitable again for forming and cutting annular products, such as doughnuts.

Although I have only described in detail two modifications which my invention may assume, it will be apparent to those skilled in the art that the invention is not so limited, but that various other modifications may be made therein without departing from the spirit thereof or from the scope of the appended claims.

What I claim is:—

1. As a new article of manufacture, an extruding die for an alimentary cutting machine of the character described comprising a blank having an indenture extending downwardly from the top through to a point in its perimetrical surface intermediate its ends.

2. As a new article of manufacture, an extruding die for an alimentary cutting machine of the character described comprising a cylindrical blank of slightly truncated conical construction having an axial indenture in its perimetrical surface.

3. As a new article of manufacture, an extruding die for an alimentary cutting machine of the character described comprising a disc-like blank having a plurality of concaved axial indentures spaced circumferentially of its peripheral surface.

4. As a new article of manufacture, an extruding die for an alimentary cutting machine of the character described comprising a blank having a plurality of spherical indentures spaced circumferentially of its peripheral surface.

5. As a new article of manufacture, an extruding die for an alimentary cutting machine of the character described comprising a cylindrical blank having a plurality of concaved indentures spaced circumferentially of its peripheral surface, said indentures extending downwardly from the top of said blank and decreasing in depth radially until they extend into the peripheral surface intermediate its ends.

6. As a new article of manufacture, an extruding die for an alimentary cutting machine of the character described comprising a blank having a plurality of indentures spaced circumferentially of its peripheral surface, said indentures extending downwardly from the top of said blank and increasing in depth axially until they extend into the peripheral surface intermediate its ends.

7. As a new article of manufacture, an extruding die for an alimentary cutting machine of the character described comprising a cylindrical blank having a plurality of concaved indentures spaced circumferentially of its peripheral surface, said indentures being concaved both axially and radially and open throughout their length to the peripheral surface.

8. As a new article of manufacture, an extruding die for an alimentary cutting machine of the character described comprising a cylindrical blank having its upper portion adjacent the top side thereof of truncated conical shape, and having an axial indenture in its perimetrical surface.

ARTHUR I. SCHLICHTER.